(12) United States Patent
Huapaya

(10) Patent No.: US 6,762,776 B2
(45) Date of Patent: Jul. 13, 2004

(54) MOUSE INPUT PANEL WINDOWS CLASS LIST

(75) Inventor: Luis Huapaya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 09/801,880

(22) Filed: Mar. 9, 2001

(65) Prior Publication Data

US 2002/0089547 A1 Jul. 11, 2002

Related U.S. Application Data

(60) Provisional application No. 60/247,831, filed on Nov. 10, 2000, provisional application No. 60/247,182, filed on Nov. 10, 2000, provisional application No. 60/247,841, filed on Nov. 10, 2000, provisional application No. 60/247,973, filed on Nov. 10, 2000, provisional application No. 60/247,842, filed on Nov. 10, 2000, provisional application No. 60/247,844, filed on Nov. 10, 2000, provisional application No. 60/247,400, filed on Nov. 10, 2000, provisional application No. 60/247,972, filed on Nov. 10, 2000, provisional application No. 60/247,843, filed on Nov. 10, 2000, provisional application No. 60/247,479, filed on Nov. 10, 2000, and provisional application No. 60/247,847, filed on Nov. 10, 2000.

(51) Int. Cl.[7] .................................................. G06F 3/00
(52) U.S. Cl. .................... 345/802; 345/767; 345/856; 345/807
(58) Field of Search ............................ 345/767, 802, 345/790, 795, 796, 797, 856, 794, 807, 806, 803, 781, 179, 180, 808

(56) References Cited

U.S. PATENT DOCUMENTS

| 5,499,334 | A | * | 3/1996 | Staab ........................ 345/778 |
| 5,666,139 | A | * | 9/1997 | Thielens et al. ............ 345/173 |
| 5,694,561 | A | * | 12/1997 | Malamud et al. ........... 345/805 |
| 5,721,849 | A | * | 2/1998 | Amro ........................ 345/802 |
| 5,872,567 | A | * | 2/1999 | Amro ........................ 345/800 |
| 6,002,862 | A | * | 12/1999 | Takaike ...................... 703/17 |
| 6,204,847 | B1 | * | 3/2001 | Wright ....................... 345/804 |
| 6,606,106 | B1 | * | 8/2003 | Mendenhall et al. ....... 345/854 |

* cited by examiner

Primary Examiner—Raymond J. Bayerl
Assistant Examiner—Kieu D. Vu
(74) Attorney, Agent, or Firm—Banner & Witcoff, Ltd.

(57) ABSTRACT

A method for returning focus to a user interface window is disclosed. Information relating to each user interface window existing within a computer operating system is stored in a working database that is different from real-time user interface window information maintained by the computer operating system. A top user interface window is determined at a display coordinate selected by, for example, a digitizing pen. Focus is returned to a last user interface window having focus when the top user interface window is a system user interface window. An informational context is determined for the top window, and data entered into the top window is recognized based on the informational context of the top window based on information stored in the working database.

20 Claims, 4 Drawing Sheets

MOUSE INPUT PANEL WINDOWS CLASS LIST

CROSS-REFERENCE TO RELATED APPLICATIONS

The present application claims priority to U.S. Provisional Patent Application Serial No. 60/247,831, entitled Mouse Input Panel Windows Class List, filed on Nov. 10, 2000, which is hereby incorporated by reference as to its entirety. The present application is also related to U.S. Provisional Patent Application Serial No. 60/247,843, entitled Mouse Input Panel and User Interface, and filed on Nov. 10, 2000; to U.S. patent application Ser. No. 09/801,929, entitled Mouse Input Panel and User Interface, and filed Mar. 9, 2001, each of which is incorporated by reference herein as to their entireties.

BACKGROUND OF THE INVENTION

1. Field of the Invention

The present invention relates to computing devices. More particularly, the present invention relates to a system and method for returning focus to a user interface window within a computer operating system.

2. Description of the Related Art

Most personal computer (PC) systems provide a plurality of techniques for a user to enter data and commands, and to manipulate data. One exemplary technique is for a user to enter data and commands using a keyboard. Other exemplary techniques include use of a mouse, a track ball, and/or a voice-actuated input device. Yet another technique involves a using a digitizing writing pad and a stylus.

In the situation when a conventional computer system has a display screen, and a user selects or clicks on a particular portion of a the display screen using, for example, a mouse, the proper informational context of the selected portion of the display is required by the operating system so that the computer responds as the user expects. For example, when the user clicks on a scrollbar displayed on the display of a conventional computer using the mouse, the underlying application responds as if a scrollbar has been clicked, instead of responding as if a character input was expected.

As another example, in the situation when the user clicks an input interface with the stylus, such as an operating system control field or window, or a softkey keyboard display, the conventional computer sends the input to the last window having focus, instead of responding as if a scrollbar has been clicked. Moreover, for this exemplary situation, the focus state of the computer should be properly returned to the last window having focus.

Focus state, or keyboard focus, as used herein, is a state that an input control interface acquires when a user selects the input control interface. An input control interface loses focus, for example, when the user selects another input control interface. Only one input control interface can have keyboard focus at a time.

Thus, what is needed is a way to determine the information context of a point that is displayed by a computer and that is selected by a user so that the computer responds properly. What is also needed is a technique for returning focus to a user input control interface when the user performs a predetermined action, such as entering a command and/or data into a computer system.

SUMMARY OF THE INVENTION

The present invention provides a way to determine the information context of a point selected by a user using a digitizing display screen/writing pad and stylus. The present invention also provides a method for returning focus to a user interface window so that a command and/or data entered by a user are directed to the proper window. Information relating to each user interface window existing, visible and not visible, within a computer operating system is stored in a working database that is different from real-time user interface window information maintained by the computer operating system. A top user interface window is determined at a display coordinate selected by, for example, a digitizing pen. Focus is returned to a last user interface window having focus when the top user interface window is a system user interface window. Additionally, an informational context is determined for the top window, and data entered into the top window is recognized based on the informational context of the top window. The information stored in the working database for each user interface window existing within the computer operating system includes an HWND ClassName, an HWND Style and an ExStyle. Additionally, the information stored in the working database for each user interface window further includes at least one of whether the user interface window is a scrollbar; whether the user interface window is a text input field, whether the user interface window is a generic input field, whether the user interface window is a filename input field, whether the user interface window is an e-mail input field, whether the user interface window is a URL input field; whether an HWND is a button; whether the user interface window is a radio-button; whether the user interface window is a checkbox, and whether the user interface window is a slider.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
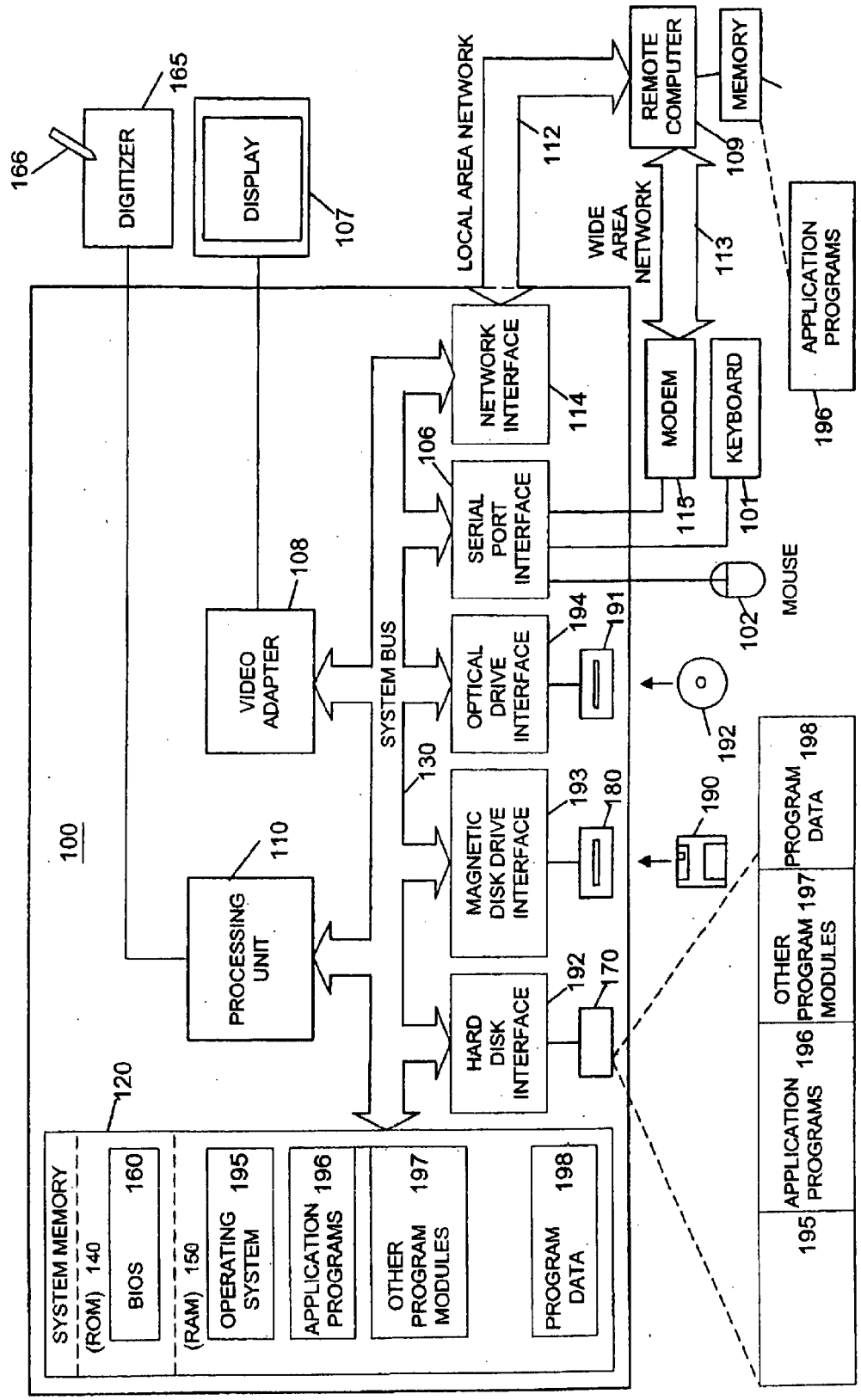
FIG. 1 shows a schematic diagram of a conventional general-purpose digital computing environment that can be used for implementing various aspects of the invention.

The present invention may be more readily described with reference to FIGS. 1–4. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to processing unit 110. System bus 130 may be any of several types of bus structures including a memory bus or memory controller, a peripheral bus, and a local bus using any of a variety of bus architectures. System memory 120 includes read only memory (ROM) 140 and random access memory (RAM) 150.

A basic input/output system 160 (BIOS), containing the basic routines that help to transfer information between elements within computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. Hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on hard disk drive 170, magnetic disk 190, optical disk 192, ROM 140 or RAM 150, including an operating system 195, one or more application programs 196, other program modules 197, and program data 198. A user can enter commands and information into computer 100 through input devices such as a keyboard 101 and pointing device 102. Other input devices (not shown) may include a microphone, joystick, game pad, satellite dish, scanner or the like. These and other input devices are often connected to processing unit 110 through a serial port interface 106 that is coupled to the system bus, but may be connected by other interfaces, such as a parallel port, game port or a universal serial bus (USB). Further still, these devices may be coupled directly to system bus 130 via an appropriate interface (not shown). A monitor 107 or other type of display device is also connected to system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between pen digitizer 165 and processing unit 110 is shown, in practice, pen digitizer 165 may be coupled to processing unit 110 via a serial port, parallel port or other interface and system bus 130 as known in the art. Furthermore, although digitizer 165 is shown apart from monitor 107, it is preferred that the usable input area of digitizer 165 be co-extensive with the display area of monitor 107. Further still, digitizer 165 may be integrated in monitor 107, or may exist as a separate device overlaying or otherwise appended to monitor 107.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other device for establishing a communications over wide area network 113, such as the Internet. Modem 115, which may be internal or external, is connected to system bus 130 via the serial port interface 106. In a networked environment, program modules depicted relative to personal computer 100, or portions thereof, may be stored in a remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
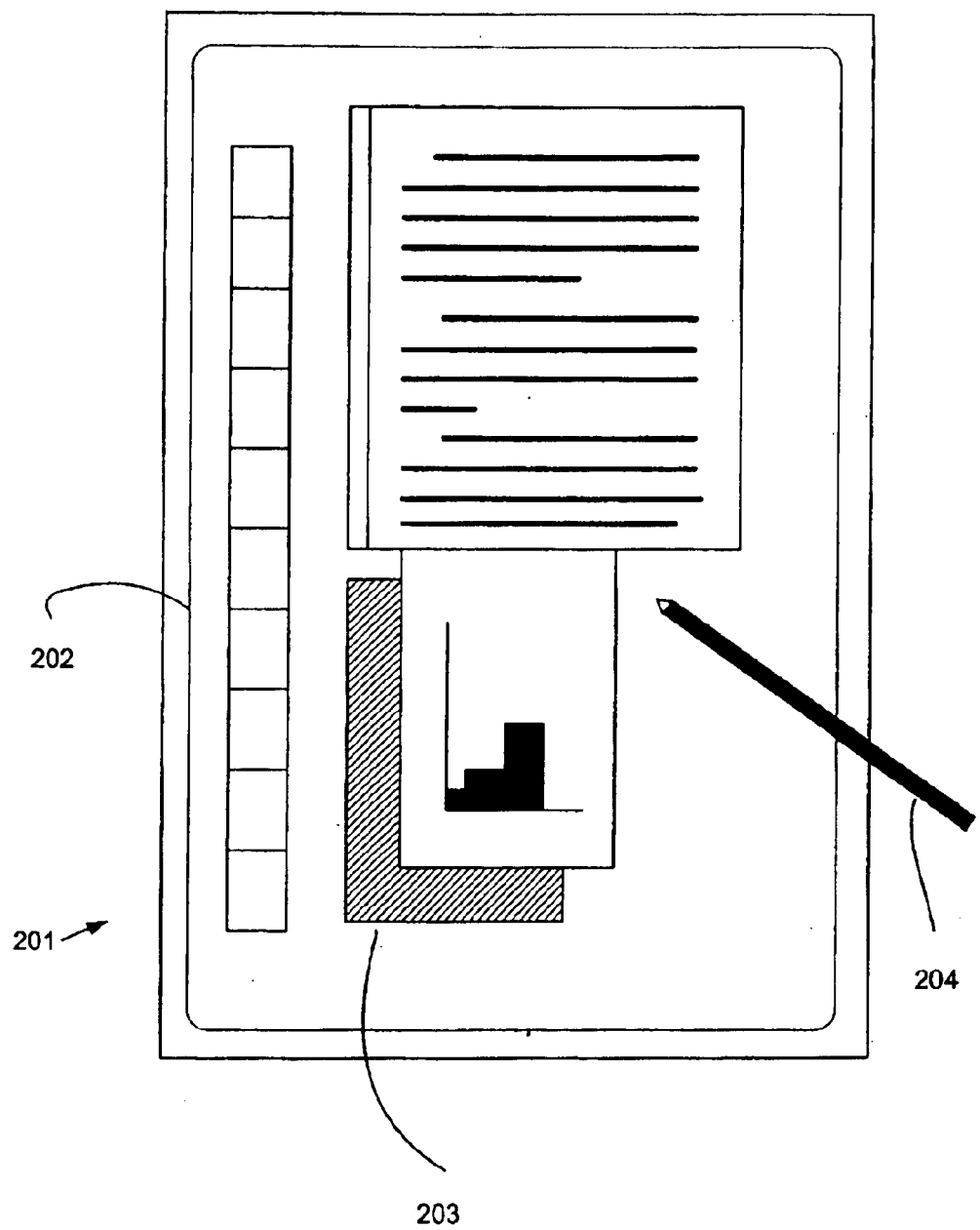
FIG. 2 shows a tablet and stylus computer that can be used in accordance with various aspects of the present invention.

FIG. 2 illustrates a tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion. The other end of the stylus constitutes an "eraser" end, which, when moved across the display, indicates portions of the display that are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

A primary aspect of the invention provides that information, i.e., text or commands, entered using a digitizing pen and a digitizing writing surface, i.e., pen strokes, is directed to the last window of a display or an application that was in a focus state. A related aspect of the invention determines whether an input field is context-sensitive information whether, that is, whether the input field accepts a generic text input or a more special input, such as an e-mail address input or a URL input. One aspect of the invention uses the context-sensitive nature of an input window for optimizing text recognition. It should be noted, though, that context-sensitive information, as used herein, encompasses windows that do not accept text, but have a context-sensitive behavior. For example, controls (i.e., windows), such as Scrollbars and Buttons, have a behavior that differs from the behavior of a generic pen. Behavior modification does not limit itself to text recognition. Behavior modification, as used herein, also encompasses simulated mouse events (i.e. WM_LBUTTONDOWN and WM_LBUTTONUP). For example, the generic behavior for a "Press and Hold" event is to generate a WM_RBUTTONDOWN/WM_

RBUTTONUP event pair. If, however, the "Press and Hold" event occurs on top of a control (i.e. windows) such as a Scrollbar or Button, this behavior is modified not to generate the right-button mouse events.

Figure 3A:
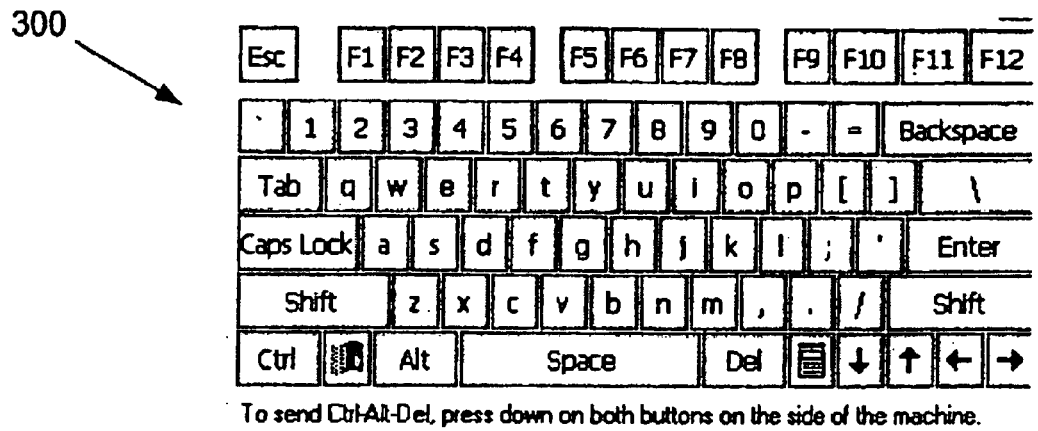
FIGS. 3a–3c respectively show an exemplary softkey keyboard, an exemplary character pad and an exemplary word pad.
Figure 3B:
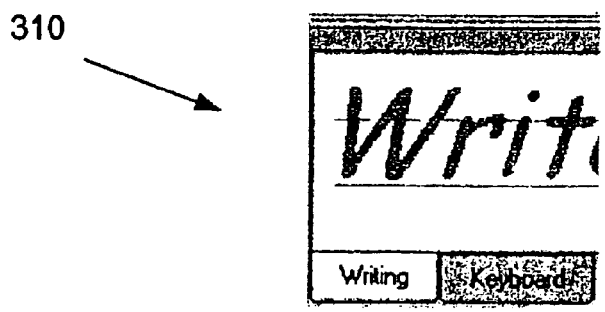
Figure 3C:

According to the invention, text and/or commands can be entered through an input window that can be selected from a tray icon. Such an input window can include, for example, a softkey keyboard and/or one or more writing pads. FIGS. 3a–3c respectively show an exemplary softkey keyboard 300, an exemplary character pad 310 and an exemplary word pad 320. Particular keys displayed on softkey keyboard 300 can be selected in a well-known manner for entering text and commands in to an application. A user can write a single character within character pad 310 using a digitizing pen for entering a single character input into an application. Similarly, a user can write a word or phrase within word pad 320 using a digitizing pen for entering a word or phrase of words as an input into an application.

To avoid a situation in which the focus given to a current application is lost when an input window, such as shown in FIGS. 3a–3c, is selected using a portion of the display having system level properties, such as a tray icon, a software button, a gesture on a digitizing writing surface, or an in-air gesture. Another input technique that can have system properties includes a hardware button. The present invention keeps track of whether the last selected window or input was a system window, a system input field or a system hardware button. When the last focus is a window, input field or hardware button having system properties, the invention ignores the system window, input field or hardware button in favor of the previous last window having focus.

To provide the advantages of the present invention, a hierarchy of window information is constructed so that each application (and each HWND for an application) has a unique and easily identifiable hierarchy. As used herein HWND is an acronym for a handle, or an identifier, for a particular open window. An HWND associated with a particular window contains operating system information that uniquely identifies the particular window and provides a set of properties possessed by the particular window. Consequently, because each HWND can be uniquely identified, information about each of HWND is stored in a hierarchy/class database that the present invention uses for determining whether a selected HWND is a system window or an application HWND and the context sensitivity of the particular HWND based on the properties possessed by the window. Preferably, each unique HWND is defined and assigned by the organization, such as a software supplier or creator, that is responsible for creating the corresponding window.

Figure 4:
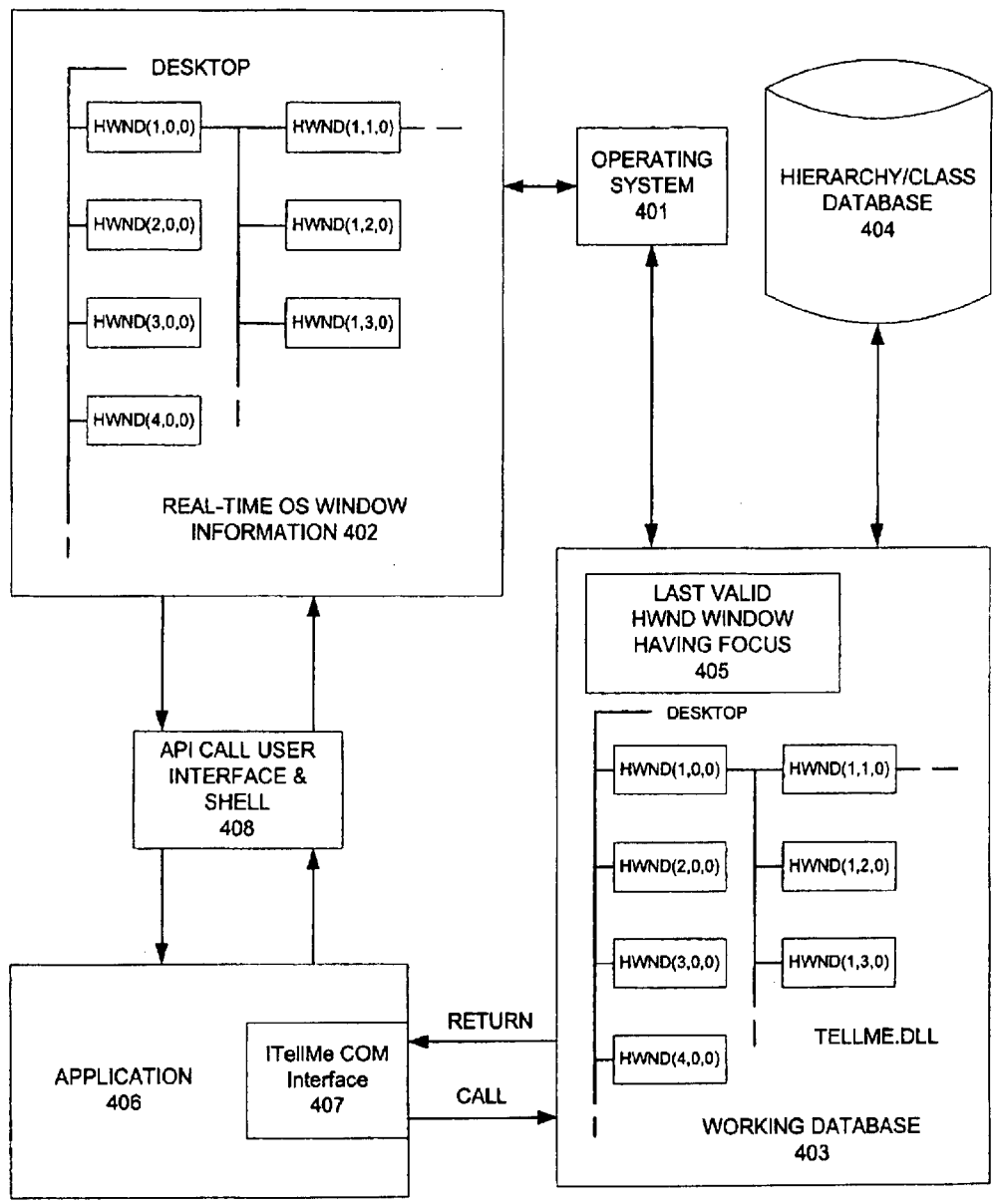
FIG. 4 shows a functional block diagram of the present invention.

FIG. 4 shows a functional block diagram of the present invention. In FIG. 4, a computer operating system (OS) 401 creates and maintains real-time OS window information 402 arranged, for example, as an interface window HWND hierarchy. For example, real-time window information 402 is arranged to have a root Desktop and a hierarchy of open windows located below the Desktop. The exemplary hierarchy shown in FIG. 4 is arranged to be a three dimensional hierarchy having each open HWND designated by a vector HWND(x, y, z). Specifically, open windows HWND (1, 0, 0), HWND(2, 0, 0), HWND(3, 0, 0) and HWND(4, 0, 0) are shown directly below the Desktop root, and open windows HWND(1, 1, 0), HWND(1, 2, 0) and HWND(1, 3, 0) are shown directly below window HWND(1, 0, 0). Of course, it should be understood that each dimension can any number of elements. Moreover, although only three dimensions are indicated for convenience, it should also be understood that the hierarchical arrangement shown in FIG. 4 could have any number of dimensions.

As operating system 401 creates a window, a corresponding unique HWND is placed into real-time window information 402. Accordingly, when a window is closed, the corresponding unique HWND for the closed window is removed from real-time window information 402. In order to determine whether a window should properly be given keyboard focus, the present invention continuously keeps track of the window hierarchy (i.e., window relationships) associated with the operating system by creating a working database 403. That is, the present invention continuously "spies" on the message queue of operating system 401 in a well-known manner in order to determine when a new window has been created and when an existing window has been closed. When a new window has been created, the present invention enters information relating to the new HWND into working database 403. The present invention then accesses a hierarchy/class database 404 to obtain additional information so that the informational context of a window can be determined. Accordingly, when a window is closed, the present invention deletes information relating to the closed HWND from working database 403.

Hierarchy/class database 404 is a local database that contains information relating to the properties of all windows that can possibly be opened on the computer system in which operating system 401 is executing. That is, database 404 contains information relating to the properties for all windows that can possibly be opened and displayed whether the window is an operating system class window or an application class window. As mentioned, the operating system supplier preferably assigns a unique HWND and corresponding properties to each window that can possibly be opened by the operating system. When the operating system is loaded onto the computer, hierarchy/class database 404 is, for example, created as part of the operating system installation process. Similarly, for each application, the application supplier preferably assigns a unique HWND and corresponding properties to each window that can possibly be opened by the application. When the application is loaded onto the computer, the information relating to the windows that can be opened by the application is loaded into hierarchy/class database 404.

The present invention also keeps track of the last valid "Non-tray, Non-desktop" HWND 405 so that when queried, the last valid HWND can again be given focus. The information stored in working database 403 can also be used by components operating within a computer system, such as an application 406 or an input panel (not shown), for determining proper focus and context-sensitive information about a particular HWND at runtime.

Preferably, the present invention records information in working database 403 relating to a parent window HWND for a window that is currently in focus. The specific operating system window information that the present invention records for a parent window in working database 403 relates to a ClassName, a Style, and an ExStyle (extended Style). ClassName is a text string that identifies the class of a window in a well-known manner. Style is, for example, a 32-bit value providing s style mask in a well-known manner. ExStyle is, for example, a 32-bit value providing an extended style mask in a well-known manner. Additionally, the present invention stores the following unique information in working database 403 for each HWND, such as whether an HWND is a scrollbar; whether an HWND is a text input field (i.e., whether the HWND accepts text);

whether an HWND is a generic input field; whether an HWND is a filename input field; whether an HWND is an e-mail input field; and whether an HWND is a URL input field; whether an HWND is a button; whether an HWND is a radio-button; whether an HWND is a checkbox; and whether an HWND is a slider. The present invention also determines whether an HWND accepts a press and hold event performed with a digitizing pen.

The present invention includes a single COM interface 407 referred to herein as ItellMe through which an application 406 can request information regarding a particular HWND that has been created through an API call user interface shell 408. The following pseudocode illustrates the ItellMe interface.

```
DECLARE_INTERFACE_(ITellMe, IUnkuown)
{
//
// IUnknown interfaces
//
STDMETHOD (QueryInterface) (THIS_ REFIID, LPVOID *) PURE;
STDMETHOD_(ULONG, AddRef) (THIS) PURE;
STDMETHOD_(ULONG, Release) (THIS) PURE;
//
// IApplicationEntry interface methods
//
STDMETHOD (GetWindowCapabilities) (THIS_ const POINT *,
LPWINDOWCAPS) PURE;
STDMETHOD (GetLastValidFocusHWnd) (THIS_ HWND *) PURE;
};
```

The GetWindowCapabilities function is used for determining special context sensitive information about a topmost HWND at a particular screen coordinate. The following function call illustrates the GetWindowsCapabilities function:

```
STDMETHOD GetWindowCapabilities(
    const POINT *      pScreenCoordinate,
    LPWINDOWCAPS       pWindowCapabilities;
);
```

The pScreenCoordinate parameter is a pointer to a POINT containing the coordinates of the HWND. The pWIndowCapabilities parameter is a pointer to a WINDOWCAPS structure that contains the context sensitive information of the topmost HWND found at the screen coordinate pScreenCoordinate.

When the GetWindowsCapabilities method succeeds, the return value is S_OK. When the GetWindowsCapabilities method fails, a FAILED( ) COM error code is returned.

The WINDOWCAPS structure is:

```
typedef struct
{
  DWORD dwSize;
  DWORD dwCapabilitiesMask;
} WINDOWCAPS, *LPWINDOWCAPS;
```

The parameter dwSize member of the WINDOWCAPS structure is initialized to sizeof(WINDOWCAPS) before calling GetWindowCapabilities( ). The dwCapabilitiesMask can be one of the following:

TELLME_CAP_PRESSANDHOLDNOTALLOWED
TELLME_CAP_TAKESTEXTINPUT
TELLME_CAP_EMAIL
TELLME_CAP_URL
TELLME_CAP_FILENAME

The GetLastValidFocusHWnd method is used for determining which HWND that is not part of the desktop (i.e., ProgMan) and not part of the TaskBar (i.e,. SysTray) last received focus. The GetLastValidFocusHWnd method is used in order to give back focus to the last application that had focus before the user activated, for example, a user interface pane by using the tray icon (which causes focus to be lost).

```
STDMETHOD GetLastValidFocusHWnd(
    HWND * ph Window
);
```

The phWindow parameter is a pointer to an HWND variable that will receive the HWND of the last non-system window that received focus.

When the GetLastValidFocusHWnd method succeeds, the return value is S_OK. When the GetLastValidFocusHWnd method fails, a FAILED( ) COM error code is returned.

While the present invention has been described in connection with the illustrated embodiments, it will be appreciated and understood that modifications may be made without departing from the true spirit and scope of the invention.

What is claimed is:

1. A method for returning focus to a user interface window, comprising steps of:

storing information relating to each user interface window existing within a computer operating system in a working database, the working database being different from real-time user interface window information maintained by the computer operating system;

determining a top user interface window at a selected display coordinate based on information stored in the working database;

receiving an input directed to the user interface window at the selected display coordinate; and returning focus to a last user interface window having focus when the top user interface window at the selected display coordinate is a system user interface window.

2. The method according to claim 1, further comprising steps of:

determining an informational context for the top window based on information stored in the working database; and recognizing the input directed to the top window based on the informational context of the top window.

3. The method according to claim 1, further comprising a step of selecting the user interface window at the selected coordinate using a digitizing pen.

4. The method according to claim 1, wherein the information stored in the working database for each user interface window existing within the computer operating system includes an HWND ClassName, an HWND Style and an ExStyle.

5. The method according to claim 4, wherein the information stored in the working database for each user interface window further includes at least one of whether the user interface window is a scrollbar; whether the user interface window is a text input field, whether the user interface window is a generic input field, whether the user interface window is a filename input field, whether the user interface window is an e-mail input field, whether the user interface window is a URL input field; whether an HWND is a button; whether the user interface window is a radio-button; whether the user interface window is a checkbox, and whether the user interface window is a slider.

6. A computer-readable medium having computer-executable instructions for performing steps comprising:

storing information relating to each user interface window existing within a computer operating system in a working database, the working database being different from real-time user interface window information maintained by the computer operating system;

determining a top user interface window at a selected display coordinate based on information stored in the working database;

receiving an input directed to the user interface window at the selected display coordinate; and returning focus to a last user interface window having focus when the top user interface window at the selected display coordinate is a system user interface window.

7. The computer-readable medium according to claim 6, further comprising computer-executable instructions for performing steps of:

determining an informational context for the top window based on information stored in the working database; and recognizing the input directed to the top window based on the informational context of the top window.

8. The computer-readable medium according to claim 6, further comprising computer-executable instructions for performing a step of selecting the user interface window at the selected coordinate using a digitizing pen.

9. The computer-readable medium according to claim 6, wherein the information stored in the working database for each user interface window existing within the computer operating system includes an HWND ClassName, an HWND Style and an ExStyle.

10. The computer-readable medium according to claim 9, wherein the information stored in the working database for each user interface window further includes at least one of whether the user interface window is a scrollbar; whether the user interface window is a text input field, whether the user interface window is a generic input field, whether the user interface window is a filename input field, whether the user interface window is an e-mail input field, whether the user interface window is a URL input field; whether an HWND is a button; whether the user interface window is a radio-button; whether the user interface window is a checkbox, and whether the user interface window is a slider.

11. A method for returning focus to a user interface window, comprising steps of:

storing information relating to each user interface window existing within a computer operating system in a working database, the information based on real-time user interface window information stored separately by the computer operating system;

determining a top user interface window at a selected display coordinate based on information stored in the working database;

receiving an input directed to the user interface window at the selected display coordinate; and returning focus to a last user interface window having focus when the top user interface window at the selected display coordinate is a system user interface window.

12. The method according to claim 11, further comprising steps of:

determining an informational context for the top user interface window based on information stored in the working database;

and recognizing the input directed to the top window based on the informational context of the top window.

13. The method according to claim 11, further comprising a step of selecting the user interface window at the selected coordinate using a digitizing pen.

14. The method according to claim 11, wherein the information stored in the working database for each user interface window existing within the computer operating system includes a HWND ClassName and a HWND Style and an ExStyle.

15. The method according to claim 14, wherein the information stored in the working database for each user interface window further includes at least one of whether the user interface window is a scrollbar; whether the user interface window is a text input field, whether the user interface window is a generic input field, whether the user interface window is a filename input field, whether the user interface window is an e-mail input field, whether the user interface window is a URL input field; whether an HWND is a button; whether the user interface window is a radio-button; whether the user interface window is a checkbox, and whether the user interface window is a slider.

16. A computer-readable medium having computer-executable instructions for performing steps comprising:

storing information relating to each user interface window existing within a computer operating system in a working database, the information based on real-time user interface window information stored separately by the computer operating system;

determining a top user interface window at a selected display coordinate based on information stored in the working database;

receiving an input directed to the user interface window at the selected display coordinate; and returning focus to a last user interface window having focus when the top user interface window at the selected display coordinate is a system user interface window.

17. The computer-readable medium according to claim 16, further comprising computer-executable instructions for performing steps of:

determining an informational context for the top user interface window based on information stored in the working database;

and recognizing the input directed to the top window based on the informational context of the top window.

18. The computer-readable medium according to claim 16, further comprising computer-executable instructions for performing a step of selecting the user interface window at the selected coordinate using a digitizing pen.

19. The computer-readable medium according to claim 16, wherein the information stored in the working database for each user interface window existing within the computer operating system includes a HWND ClassName and a HWND Style and an ExStyle.

20. The computer-readable medium according to claim 19, wherein the information stored in the working database for each user interface window further includes at least one of whether the user interface window is a scrollbar; whether the user interface window is a text input field, whether the user interface window is a generic input field, whether the user interface window is a filename input field, whether the user interface window is an e-mail input field, whether the user interface window is a URL input field; whether an HWND is a button; whether the user interface window is a radio-button; whether the user interface window is a checkbox, and whether the user interface window is a slider.

* * * * *